United States Patent
Silvanus et al.

(10) Patent No.: US 9,919,378 B2
(45) Date of Patent: Mar. 20, 2018

(54) WELDING TOOL COMPRISING A SHOULDER, WELDING METHOD AND WORKPIECE

(75) Inventors: Juergen Silvanus, Munich (DE); Erich Forster, Grossaitingen (DE); Eric Tauscher, Augsburg (DE)

(73) Assignee: EADS Deutschland GmbH, Ottobrunn (DE)

(*) Notice: Subject to any disclaimer, the term of this patent is extended or adjusted under 35 U.S.C. 154(b) by 0 days.

(21) Appl. No.: 14/126,335

(22) PCT Filed: Jun. 1, 2012

(86) PCT No.: PCT/DE2012/000576
§ 371 (c)(1),
(2), (4) Date: Apr. 3, 2014

(87) PCT Pub. No.: WO2012/171522
PCT Pub. Date: Dec. 20, 2012

(65) Prior Publication Data
US 2014/0203067 A1 Jul. 24, 2014

(30) Foreign Application Priority Data
Jun. 15, 2011 (DE) .................. 10 2011 106 505

(51) Int. Cl.
*B23K 20/12* (2006.01)

(52) U.S. Cl.
CPC ........ *B23K 20/122* (2013.01); *B23K 20/1245* (2013.01); *B23K 20/1265* (2013.01)

(58) Field of Classification Search
USPC ................. 228/112.1, 113, 114, 2.1
See application file for complete search history.

(56) References Cited

U.S. PATENT DOCUMENTS

| | | | |
|---|---|---|---|
| 5,794,835 A * | 8/1998 | Colligan et al. | 228/2.1 |
| 2003/0209588 A1 | 11/2003 | Colligan | |
| 2007/0152015 A1* | 7/2007 | Burton | B23K 20/1255 228/2.1 |
| 2008/0006678 A1 | 1/2008 | Packer et al. | |
| 2008/0296350 A1* | 12/2008 | Henneboehle et al. | 228/112.1 |
| 2009/0152328 A1 | 6/2009 | Okamoto et al. | |
| 2009/0311549 A1 | 12/2009 | Fernandez et al. | |
| 2010/0288820 A1* | 11/2010 | Aliaga | B23K 20/1255 228/112.1 |

(Continued)

FOREIGN PATENT DOCUMENTS

| DE | 10 2005 030 800 A1 | 1/2007 |
|---|---|---|
| EP | 2 266 745 A1 | 12/2010 |
| JP | 2004-34141 A | 2/2004 |

(Continued)

OTHER PUBLICATIONS

DE102005038000B4 computer translation.*

(Continued)

*Primary Examiner* — Erin B Saad
(74) *Attorney, Agent, or Firm* — Crowell & Moring LLP

(57) ABSTRACT

A welding tool for connecting at least two workpieces at a connection region by friction stir welding includes a shoulder that separates the connection region from the surroundings. The shoulder is designed as a molding tool to mold during the friction stir welding.

7 Claims, 4 Drawing Sheets

(56) References Cited

U.S. PATENT DOCUMENTS

2012/0153007 A1* 6/2012 Sall .................... B23K 20/1255
                                                          228/112.1

FOREIGN PATENT DOCUMENTS

| JP | 2007-245175 A | 9/2007 | | |
|---|---|---|---|---|
| JP | 2009-190040 A | 8/2009 | | |
| WO | WO 2010149478 A1 * | 12/2010 | ......... | B23K 20/1255 |

OTHER PUBLICATIONS

Terry Khaled, Federal Aviation Administration, "An Outsider Looks at Friction Stir Welding", Jul. 2005.*
International Search Report dated Nov. 21, 2012 with English translation (seven (7) pages).
German Office Action dated Jan. 10, 2013 (five (5) pages).
Martin et al., "Novel techniques for corner joints using friction stir welding," TMS 2011 Annual Meeting & Exhibition, 2011, pp. 1-6, San Diego, CA. XP55043739.
German-language European Office Action issued in European counterpart application No. 12 742 786.2-1702 dated Feb. 16, 2016 (Five (5) pages).
European Office Action issued in European counterpart application No. 12 742 786.2-1702 dated Mar. 22, 2017 (Six (6) pages).

* cited by examiner

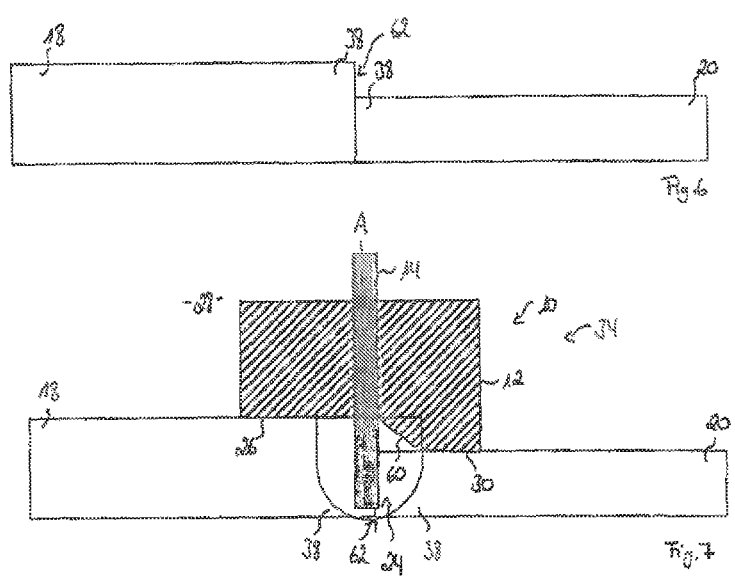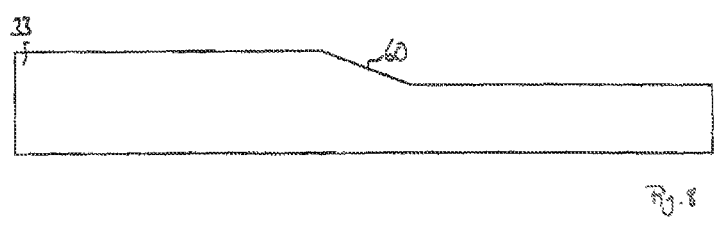

WELDING TOOL COMPRISING A SHOULDER, WELDING METHOD AND WORKPIECE

BACKGROUND AND SUMMARY OF THE INVENTION

Exemplary embodiments of the invention relate to a welding tool for connecting at least two workpieces at a connection region by means of friction stir welding.

In friction stir welding, in contrast to friction welding, the friction energy is not generated by rotation of one of the two workpieces being connected relative to the other workpiece; rather, a wear-resistant welding tool applies rotational energy to the two workpieces. In the process, the following steps are carried out:

In the first step, the welding tool and the rotating probe thereof are pressed with high force into a connection region between the two workpieces being connected, until a shoulder of the welding tool, the shoulder surrounding the probe in a contactless manner, comes to rest on the surface of the workpieces.

In the second step, the rotating probe remains on the welding start point for a brief time, and the connection region between the shoulder of the welding tool and the workpieces heats up to just below the melting point of the material of the workpieces. In this process, the workpieces become soft and plasticize, such that a mixing of the materials of the workpieces being connected is possible in the connection region.

In the third step, the welding tool is moved in the direction of advancement in such a manner that the probe and the shoulder continue to be pressed against the surface of the workpieces with high force. During the advancement movement, a pressure difference is created between the forward region of the welding tool and the rearward end thereof, as a result of the rotary movement of the probe, such that plasticized material is transported around the probe, mixes, and therefore contributes to the formation of the welded seam.

At the end of the welded seam, the welding tool is removed from the connection region.

The welding tool therefore comprises the probe and the shoulder, the same having a larger diameter than the probe itself and being arranged substantially perpendicularly thereto. The shoulder serves the purpose of insulating the welded seam from the surrounding air, while the probe is responsible for the stirring of the material. Because the material is utilized to form the welded seam, by means of the stirring, no additional materials are required. In addition, there is no need to use an inert gas atmosphere.

The friction stir welding process has the disadvantage that the shoulder must be in continuous contact with the workpieces being welded, and as a result, the freedom of movement of the welding tool in three dimensions is restricted. By way of example, it is not possible to weld containers all the way into the corners thereof, it is not possible to weld scarf joints and flange seams, and excesses of material are created that must be removed by further treatment.

Exemplary embodiments of the invention are directed to a welding tool that can be used to overcome the problems named above.

A welding tool for connecting at least two workpieces at a connection region by means of friction stir welding has a shoulder for the purpose of separating the connection region from the surroundings. The shoulder is designed as a molding tool.

As such, it is possible to adapt the shoulder to the respective welding situation, and it is possible to produce connections which have previously not been possible using friction stir welding. This is because the accessibility of the probe to the connection region being welded is improved by means of the adapted shoulder.

The shoulder is preferably designed and constructed for the purpose of molding the connection region.

The connection region is preferably the specific region of the at least two workpieces that is heated by the friction energy during the friction stir welding process. This means that it is preferably not only the plasticized joining zone, but also a region adjacent thereto, which is heated at least to the extent that it can be molded or deformed.

The shoulder preferably has a projection on and/or next to a shoulder surface that is intended to be arranged on the connection region during the friction stir welding. As such, it is possible, by way of example, to place the projection on one side of an edge of the workpiece, while the shoulder surface is positioned on the other side of the edge of the workpiece. According to the design of the region between the shoulder surface and the projection, the edge of the workpiece can be molded at the same time, and, for example, a rounding, a bevel, and/or a chamfer can be formed.

The projection is also preferably given a stepped design on a projection surface that is intended to be arranged on the connection region during the friction stir welding process. As such, it is also possible to tightly press the workpieces being connected together, for example in the direction of advancement, by means of the stepped profile of the projection surface, and therefore to join the metal together by a flange, for example.

The steps of the projection surface in this case can be connected to each other perpendicularly or via a slope, or via a rounding, by way of example.

Multiple projections are advantageously formed on and/or next to the shoulder surface. As such, a multi-faceted molding is also possible, in an advantageous manner, in the connection region of two workpieces being connected.

In one particularly preferred embodiment, the projection is designed for the purpose of molding a bevel and/or a rounding and/or a chamfer on the connection region, particularly on an edge of the connection region. In this case, the projection surface, together with the shoulder surface, has a negative counter-shape to the bevel and/or the rounding and/or the chamfer, by way of example, which is then guided in the direction of advancement along the workpieces being connected, in the connection region. As an advantageous result, there is no need to treat the final workpiece formed as a result of the connection of the two workpieces.

In a further advantageous manner, the shoulder has a shoulder surface region with a convex and/or concave curve. As such, it is advantageously also possible to weld together two workpieces with small convex and/or concave radii, in a simple manner.

In a particularly preferred manner, the shoulder is designed for the purpose of molding the connection region and/or the at least one workpiece. Due to the applied friction energy, the workpiece material softens and can then be molded. For this reason, it is possible to form fluid transitions between the two workpieces being connected, in a simple manner, by means of the shoulder pressed on the connection surface, the shoulder being designed as a molding tool, without the need to use additional material.

It is further advantageous that the shoulder is designed for the purpose of molding a welded seam created during the friction stir welding process at the connection region. As such, it is possible to dispense with a subsequent treatment of the welded seam.

A welding method for connecting at least two workpieces at a connection region by means of friction stir welding has the following steps:

a) provision of the described welding tool;
b) friction stir welding at the connection region with simultaneous molding of the connection region and/or of the at least one workpiece and/or a welded seam formed as a result.

It is particularly preferred that a workpiece is produced by means of the described welding tool and/or by means of the described welding method.

BRIEF DESCRIPTION OF THE DRAWING FIGURES

Embodiments of the invention are explained below in greater detail with reference to the attached drawings, wherein:

FIG. 6 shows two workpieces with different thicknesses being connected;

FIG. 7 shows a longitudinal cutaway view of a fifth embodiment of the welding tool for connecting the two workpieces in FIG. 6;

FIG. 8 shows the resulting final workpiece after the connection of the two workpieces in FIG. 6.

DETAILED DESCRIPTION

Figure 1:
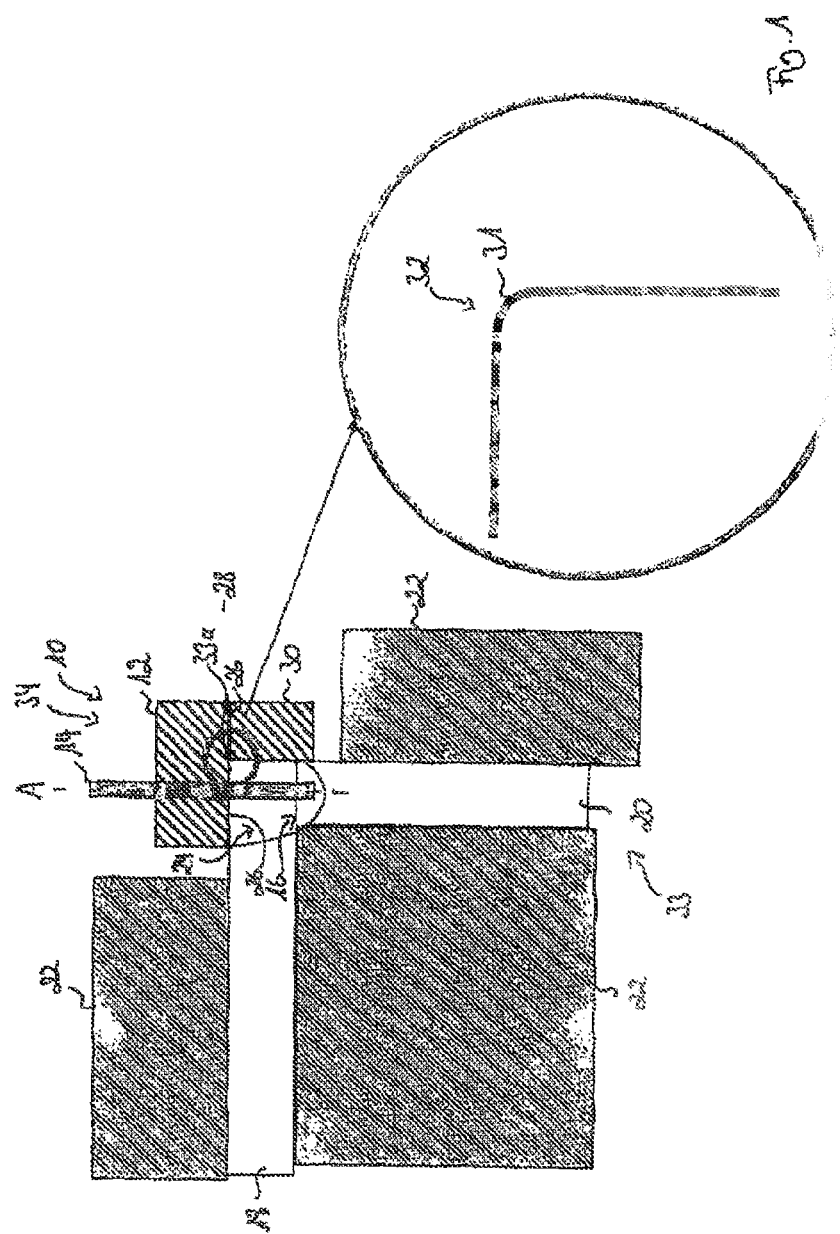
FIG. 1 shows a longitudinal cutaway view of a first embodiment of a welding tool.

FIG. 1 shows a longitudinal cutaway view of a first embodiment of a welding tool 10 having a shoulder 12 and a probe 14 for the purpose of connecting two workpieces 18, 20 by means of friction stir welding.

The workpieces 18, 20 are secured against sliding by means of holder devices 22 during the treatment with the welding tool 10.

The probe 14 rotates about an axis A. To connect the workpieces 18, 20, the probe 14 of the welding tool 10 brings friction heat into a connection region 24 of the workpieces 18, 20, via the first workpiece 18. In this way, the material of the workpieces 18, 20 softens, is stirred in the region of the joining zone by the rotation of the probe 14, and the workpieces 18, 20 become connected to each other.

The shoulder 12 surrounds the probe 14 without contacting the same, and lies on the workpieces 18, 20 via the shoulder surface 26 thereof, in the region of the connection region 24, in order to separate the connection region 24, as well as a welded seam (not shown) formed by means of the friction stir welding process, from a surroundings 28 in this way, and therefore to prevent contact with air. The shoulder 12 has a projection 30 arranged on the shoulder surface 26, the projection extending substantially perpendicularly to the shoulder surface 26 along the direction of extension of the second workpiece 20.

In the circled, enlarged illustration in FIG. 1, it can be seen that the first workpiece 18 should have a rounding 31 on an edge 32 of the workpiece of a final workpiece 33, following connection to the second workpiece 20. This is achieved in that a rounded edge 33a is formed between the shoulder surface 26 and the projection 30, such that the shoulder 12 functions as a molding tool 34. If the welding tool 10 moves in a direction of advancement at this point, which is perpendicular to the plane of the drawing, the shoulder 12 molds the rounding 31 on the edge 32 of the workpiece as a result of the rounded edge 33a.

Figure 2:
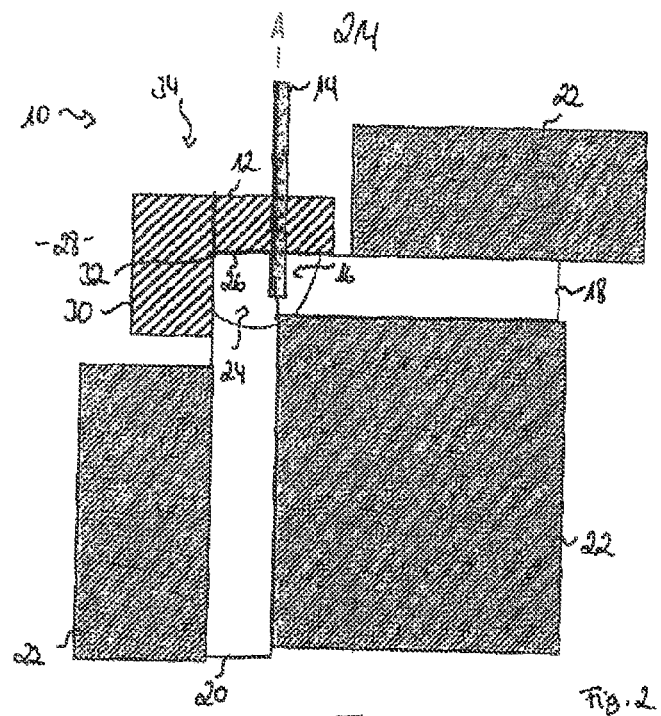
FIG. 2 shows a longitudinal cutaway view of a second embodiment of a welding tool.

FIG. 2 shows a longitudinal cutaway view of a second embodiment of a welding tool 10, having the shoulder 12 and the probe 14. The shoulder in this case likewise has the projection 30, which, however, is arranged not on the shoulder surface 26, but rather next to the same. As such, a welded seam can be produced at a larger distance from the edge 32 of the workpiece, and at the same time the edge 32 of the workpiece can be molded.

Figure 3:
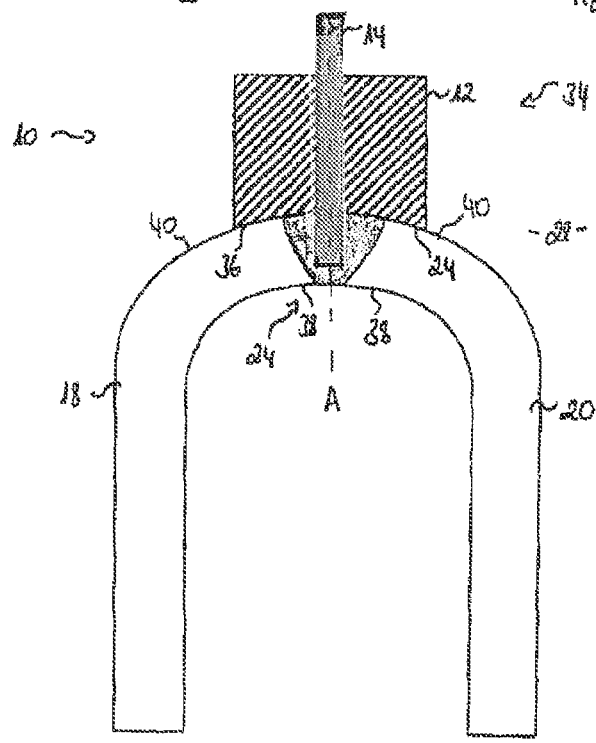
FIG. 3 shows a longitudinal cutaway view of a third embodiment of a welding tool for welding a U-profile.

The longitudinal cutaway view in FIG. 3 shows a third embodiment of the welding tool 10, wherein the shoulder 12 has a shoulder surface region 36 with a convex curve. With the curved shoulder surface region 36, it is possible to weld workpieces 18, 20 to each other on rounded ends 38, while forming a concave surface 40. As an alternative, the shoulder surface region 36 can also have a concave curvature in order to mold a convex connection region 24.

Figure 4:
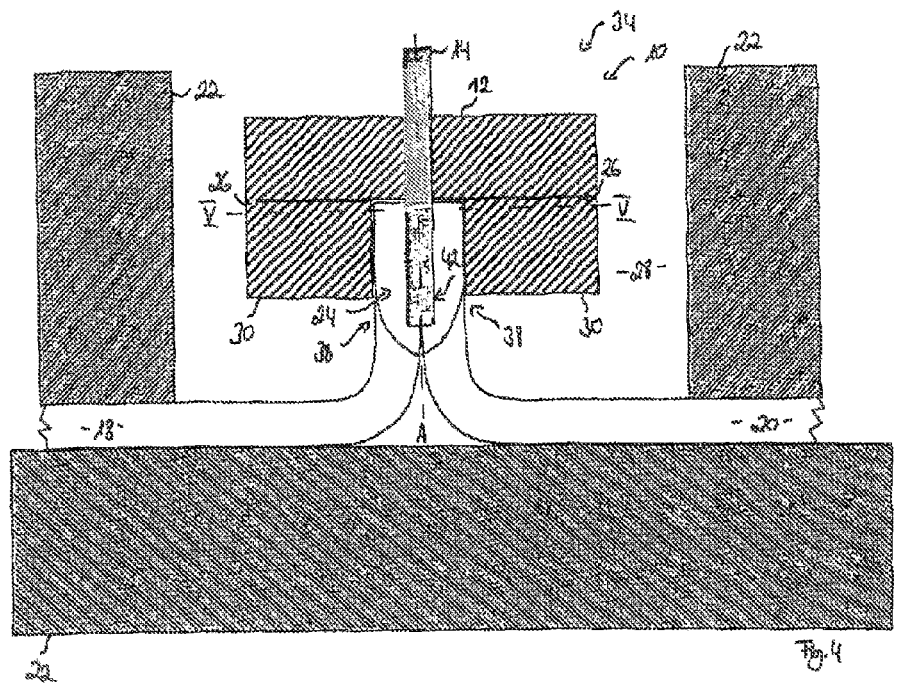
FIG. 4 shows a longitudinal cutaway view of a fourth embodiment of a welding tool for producing a flange seam.
Figure 5:
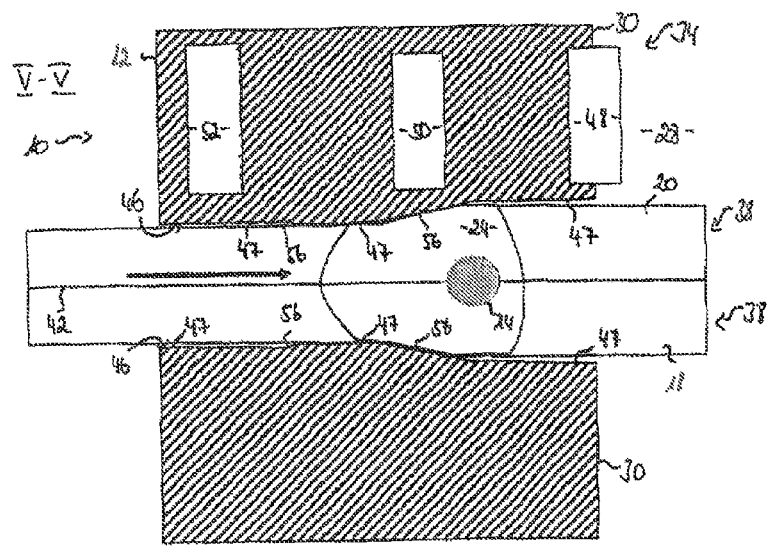
FIG. 5 shows a cross-section view of the welding tool in FIG. 4, cut at line V-V.

FIGS. 4 and 5 show the connection of the workpieces 18, 20 for the purpose of forming a flange seam 42 by means of the welding tool 10, in a fourth embodiment. FIG. 4 in this case is a longitudinal cutaway view of the welding tool 10, and FIG. 5 is a cross-section view cut at line V-V in FIG. 4.

In the illustrated embodiment, two projections 30 are constructed on the shoulder surface 26, in order to enclose the end regions 38 of the workpieces 18, 20 being connected. The probe 14 projects into a gap between the end regions 38, and applies friction heat to the connection region 24 for the purpose of plasticizing the end regions 38. As a result of the projections 30, the heated and/or plasticized end regions 38 are pressed together, and the flange seam 42 is formed.

FIG. 5 shows that the projections 30 are designed having steps 47 on projection surfaces 46 which face the end regions 38. The direction of advancement is indicated by the arrow. The projections 30 have, in the direction of advancement, a starting region 48, a compression region 50, and an exit region 52 as the steps 47. The steps 47 are connected to each other via slopes 56.

Along the direction of advancement, the end regions 38 come first into contact, during the friction stir welding process, with the starting region 48, and are plasticized by the rotary movement of the probe 14. When in the plasticized state, they are contacted by the compression region 50, which presses together the end regions 38 and therefore creates a flange on the same. The exit region 52 of the projections 30 has no contact after the flanging with the end regions 38, such that the flange seam 42 can harden without further molding. The exit region 52 prevents an accumulation of material on the flange seam 42, such that it remains smooth and without burrs.

FIGS. 6 to 8 show the connection of two workpieces 18, 20 of different thicknesses, into one final workpiece 33. The shoulder 12 of the welding tool 10 shown in a longitudinal cross-section in this fifth embodiment has the projection 30 connected to the shoulder surface 26 via a bevel 60. By means of this embodiment, it is possible to also produce the bevel 60 between the workpieces 18, 20 being connected. The bevel 60 is created by means of the friction stir welding process using the welding tool 10 shown in FIG. 7, at a connection region 62 between the workpieces 18, 20. The final workpiece 33 shown in FIG. 8 results.

In the shown embodiment, the shoulder 12 of the welding tool 10 is shaped for specific tasks. As such, it is possible to create connections which were not previously possible.

The preferred joining technique in the construction of aircraft at the present time is still riveting. However, hardly any further possibilities for cost reduction or weight savings can be reasonably expected from this mature technology. New technologies, such as the use of fiber-reinforced plastics, for example, are beginning to compete with the established methods and materials. In the field of metallic materials, only further-developed, new materials, and further-developed joining methods, in combination, can contribute to progress in the product properties and to a reduction in cost.

By means of the welding tool 10 shown in the embodiments, a new joining method is possible. It is possible to produce connections that could not be previously created, or were very difficult to create; by way of example, it is now possible to weld edge joints and containers completely up to the corners, and/or flange seams, by means of friction stir welding. In addition, it is possible to prevent an excess of material and/or to automatically treat and therefore remove an excess of material by means of the shoulder 12. Further, it is possible to mold welded seam surfaces and define important transitions. This was previously not possible using friction stir welding tools.

As a result of the special shape of the shoulder 12, accessibility is improved, the welding process is simpler, and the workpieces 18, 20 can be clamped more securely. The edge 32 of the workpiece can be molded, by way of example, as a rounding 31, as a bevel 60, or as a chamfer. In addition, an inner corner of the workpieces 18, 20, by way of example, can be molded onto an inner clamp block as a holder device 22. Compared to a fillet weld, for example, the use of the welding tool 10 in the shown embodiments is simpler and more process-secure; in addition, it is possible to weld the workpieces 18, 20 all the way to the corners. The shape, weight, and form of the shoulder 12 designed as a molding tool 34 can be adapted to requirements, such as the heat present in the welded region, and the desired seam shape, for example.

It is possible to weld scarf joints, gapless flange seams 42, defined transitions of different thickness of sheet metal, and small radii in the friction stir welding process by means of the welding tool 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS 10 welding tool
12 shoulder
14 probe
16 hollow seam
18 first workpiece
20 second workpiece
22 holder device
24 connection region
26 shoulder surface
28 surroundings
30 projection
31 rounding
32 edge of the workpiece
33 final workpiece
33a edge
34 molding tool
36 shoulder surface region
38 end region
40 concave surface
42 flange seam
46 projection surface
47 step
48 starting region
50 compression region
52 exit region
56 slope
60 bevel
62 edge of the connection region
A axis.

The invention claimed is:

1. A welding tool for connecting at least two workpieces at a connection region by means of friction stir welding, the welding tool comprising:
a probe configured to rotate around a rotation axis, wherein the connection region is softened by friction heat provided by the probe during said friction stir welding;
a shoulder, through which the probe passes without contacting the shoulder, wherein the shoulder separates the connection region from the surroundings,
wherein the shoulder has a projection on or next to a lateral surface of the shoulder,
wherein the projection is arranged on the softened connection region during the friction stir welding process, and
wherein the projection is non-displaceably fixed on or next to the lateral shoulder surface in a direction of the rotation axis,
wherein the projection has a projection surface, which is configured to be arranged on the softened connection region during the friction stir welding process,
wherein the projection surface has a first step and a second step that is set off from the first step in a longitudinal direction that is perpendicular to the rotation axis,
wherein a plurality of projections, including the projection, are formed on or next to the shoulder surface, and
wherein the plurality of projections each have a surface, including the projection surface, facing each other in the longitudinal direction, and wherein a distance between the surfaces facing each other varies in the longitudinal direction.

2. The welding tool of claim 1, wherein the shoulder is rotationally asymmetric about the probe.

3. The welding tool of claim 1, wherein the first step is connected to the second step via a slope.

4. The welding tool of claim 1, wherein each of the plurality of projections comprises a corresponding projection surface having a respective first step and respective second step that is set off from the respective first step in the longitudinal direction.

5. The welding tool of claim 4, wherein each of the respective first steps is connected to a corresponding one of the respective second steps via a respective slope, wherein each of the respective slopes extend in the longitudinal direction.

6. The welding tool of claim 1, wherein the shoulder is configured to mold the softened connection region or the at least one workpiece.

7. The welding tool of claim 1, wherein the shoulder is configured to mold a welded seam formed during the friction stir welding process at the softened connection region.

\* \* \* \* \*